United States Patent [19]

Busching

[11] Patent Number: 4,769,106
[45] Date of Patent: Sep. 6, 1988

[54] APPARATUS FOR MANUFACTURING PRODUCTS OF WELDED PLASTIC SHEETS

[75] Inventor: Markus Busching, Ainring, Fed. Rep. of Germany

[73] Assignee: Paul Kiefel Hochfrequenz-Anlagen GmbH, Freilassing, Fed. Rep. of Germany

[21] Appl. No.: 928,545

[22] Filed: Nov. 10, 1986

[30] Foreign Application Priority Data

Nov. 11, 1985 [DE] Fed. Rep. of Germany ....... 3539972
Mar. 27, 1986 [DE] Fed. Rep. of Germany ....... 3610551

[51] Int. Cl.⁴ .................... B30B 15/30; B30B 15/34
[52] U.S. Cl. .................. 156/497; 100/93 P; 100/222; 100/269 A; 100/270; 156/498; 156/510; 156/553; 156/583.1; 156/583.5
[58] Field of Search ............... 100/93 P, 215, 218, 100/222, 269 A, 270; 156/515, 581, 583.1, 583.5, 497, 498, 510, 553; 198/817

[56] References Cited

U.S. PATENT DOCUMENTS

| | | | |
|---|---|---|---|
| 2,997,083 | 8/1961 | Pfefer | 100/269 A |
| 3,200,686 | 8/1965 | Norton et al. | 226/162 |
| 3,701,709 | 10/1972 | Bianchini | 156/497 |
| 3,770,581 | 11/1973 | Orbison et al. | 198/817 |
| 3,933,569 | 1/1976 | Grasvoll | 156/515 |
| 4,012,275 | 3/1977 | Sjoholm et al. | 156/515 |
| 4,080,241 | 3/1978 | Grevich et al. | 156/498 |
| 4,362,593 | 12/1982 | Grevich | 156/498 |
| 4,460,431 | 7/1984 | Keller et al. | 156/515 |

Primary Examiner—Michael Wityshyn
Attorney, Agent, or Firm—Saidman, Sterne, Kessler & Goldstein

[57] ABSTRACT

A machine for manufacture of products formed by welding of plastic film sheets is disclosed comprising a welding station, a cutting station, and a conveying apparatus which serves to guide the plastic sheets through the stations. The conveying apparatus consists of a moving carriage with grasping devices for grasping the plastic sheets. The carriage comprises a cam slot extending perpendicular to its direction of motion. A driven cam follower engaged in the cam slot drives the carriage from a first position, in which the grasping devices grasp the sheets, into a second position at the end of the feed carriage travel, at which the sheets are released. A conveyor belt supports the film sheets between the various stations. A lift mechanism activates the welding press during the reverse motion of the carriage; it is driven by the drive shaft driving the crank arm. The speed of the motor driving the drive shaft may be varied during each machine cycle to optimize its operation.

19 Claims, 4 Drawing Sheets

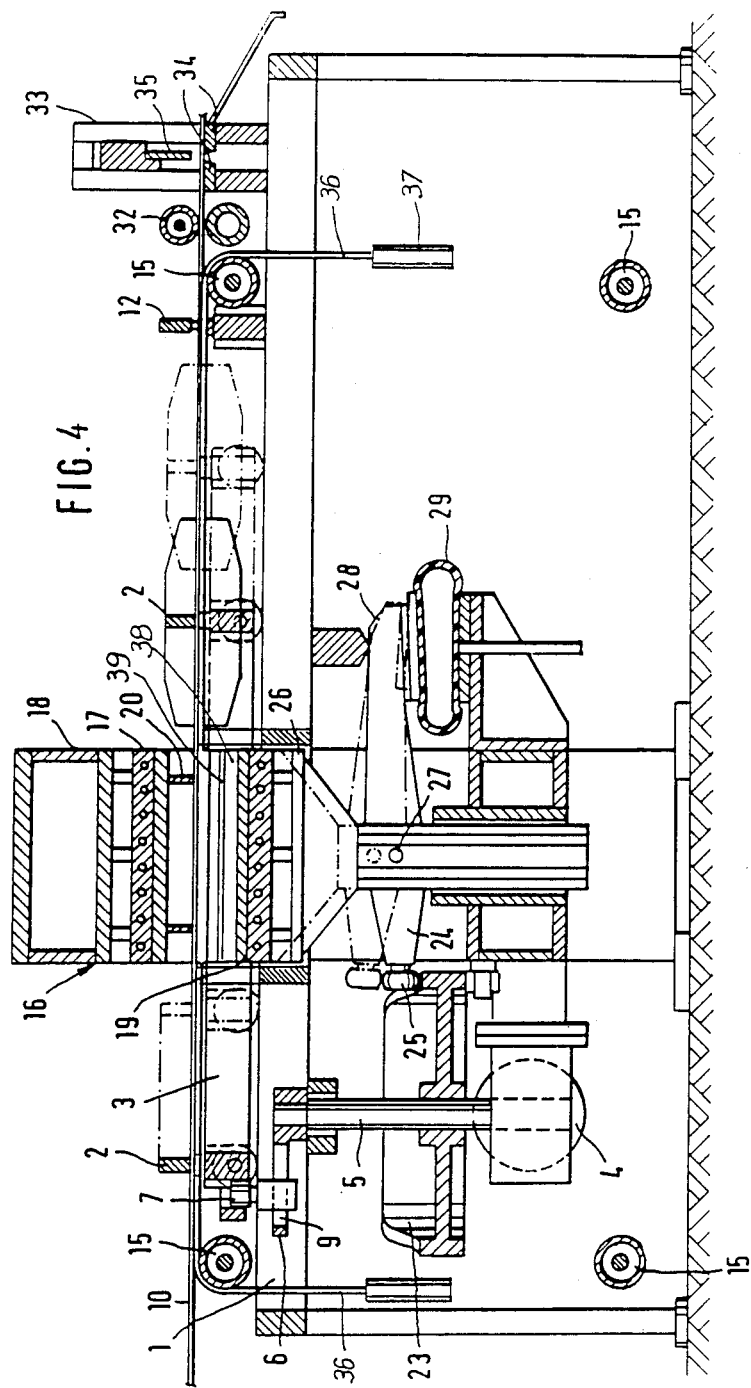

APPARATUS FOR MANUFACTURING PRODUCTS OF WELDED PLASTIC SHEETS

FIELD OF THE INVENTION

This invention relates to a device for manufacturing products formed out of plastic films or sheets, wherein the products comprise at least two overlapping plastic films joined to each other along a welded seam. More particularly, the invention relates to a machine for manufacturing products of welded plastic sheets, including a welding station and a separating station, and a conveyor guiding the plastic films through the welding and separating stations.

BACKGROUND OF THE INVENTION

Products manufactured of welded plastic films primarily include covers, such as prospectus covers, file covers, schoolbook protectors, letter files, or the like. These covers are typically made by welding two planar sheets to one another along one or more weld seams, to define a like number of creases. Available machines for the welding of films for covers and the like do not operate at desirably high speeds, and do not provide automatic separation of the welded plastic films in synchronization with the film welding.

The art seeks a machine for manufacturing products by welding plastic films which operates at high rates and which comprises means for separating the welded objects.

According to the invention, a machine for forming objects by welding plastic sheets is provided which comprises a sheet conveying device. The sheet conveying device comprises a moving carriage carrying film grasping devices. The carriage includes a guide groove receiving a cam roller. The groove extends perpendicular to the direction of travel of the carriage. A cam roller carried by a crank arm mounted on a main drive shaft engages the guide groove, so that as the main drive shaft is rotated, it drives the carriage forward and backward, from an initial position, in which the grasping devices grip the film sheets, to a second position at the end of the carriage travel, where the grasping devices release the film sheets. The sheets are welded in the second position, and are subsequently cut at a separating station to form individual products. The machine according to the invention also comprises a conveyor belt which supports the film sheets between the various stations, and a lifting mechanism which activates the welding press, during the reverse motion of the feed carriage. The lifting mechanism is also driven by the main drive shaft bearing the crank arm driving the carriage.

According to the invention, the plastic film layers in the area of the desired welds are heated to their melting temperature and are subsequently cooled under pressure and without relative motion of them with respect to each other. The welded film sheets may be held by stationary cooling grippers for additional cooling, while the main drive shaft returns the carriage and the grasping devices to the first position, ready to grip the film sheets again to advance them further.

In a preferred embodiment, the machine of the invention comprises additional stationary grippers for holding the film sheets during the reverse motion of the carriage, that is, while the film grasping devices are open. Pneumatic piston/cylinder units activated by solenoid valves activate the grippers and the grasping devices. Precise positioning of the plastic sheets in the processing stations is assured by the phased activation of the moving grasping devices and stationary grippers. The inherent response lag times of the valves and of the piston/cylinder units can be compensated by a per se known electronic time measurement system, and their operation synchronized to the rotational speed of the main drive shaft.

In a particularly preferred embodiment of the invention, a cylindrical cam is placed on the main drive shaft to activate the welding mechanism, which comprises a press having at least one heated anvil. Upon each rotation of the main drive shaft, this cylindrical cam provides precise activation of the welding mechanism. A single-arm lever is preferably inserted between the cylinder cam and the welding mechanism. One end of the lever comprises a cam roller riding on the cylindrical cam; a pivot on the lever supports the welding mechanism, and the fulcrum of the lever is supported by an air bag or the equivalent, which allows control of the pressure exerted by the welding press.

If the rotational speed of the main drive shaft is constant, the time intervals between welds is constant, and the rate of production of the machine is limited by the time taken by the carriage to return to the second position, that is, to bring a subsequent portion of the sheets to the welding station to be welded. That is, if the rate of rotation of the main drive shaft is constant, the travel rate of the carriage in the forward direction, during which the carriage brings a pair of sheets to the welding station to be welded, is equal to that in the reverse direction, during which the sheets are welded and the carriage returns. If film sheets are being processed having mechanical properties which would allow for higher feed velocities (that is, compared to the time required to weld the sheets), which would result in higher production rates, the limitation to equal forward and reverse travel times is very unfavorable.

In a preferred embodiment, machine output is increased by provision of a multiphase ac motor and a control device, driving the main drive shaft transformer which allows reduction of the drive shaft rotational speed during a part of each rotation. As a result, the basic rotational speed of the main drive shaft is set as high as possible, corresponding to the mechanical properties of the films being transported. If the resulting welding time at this rotational speed proves to be insufficient, then the angular velocity of the main drive shaft is reduced when the press is closed and is increased to the set speed just before the press opens again; that is, the welding time is increased.

In this way, the velocity of the main shaft is reduced only while the welding press is closed and the carriage returns to the first position. All other mechanical motions occur at the maximum permissible velocity. More rapid operation and higher output are provided, by comparison with systems in which the welding time is extended by reduction of overall machine drive speed.

Additional details, advantages, and features of the invention are provided in the following description and drawings, to which reference is made expressly for all details not contained in the text.

BRIEF DESCRIPTION OF THE DRAWINGS

In the drawings:

FIG. 4 shows a vertical, longitudinal section, taken along line IV—IV of FIG. 3.

DESCRIPTION OF THE PREFERRED EMBODIMENTS

Figure 1:
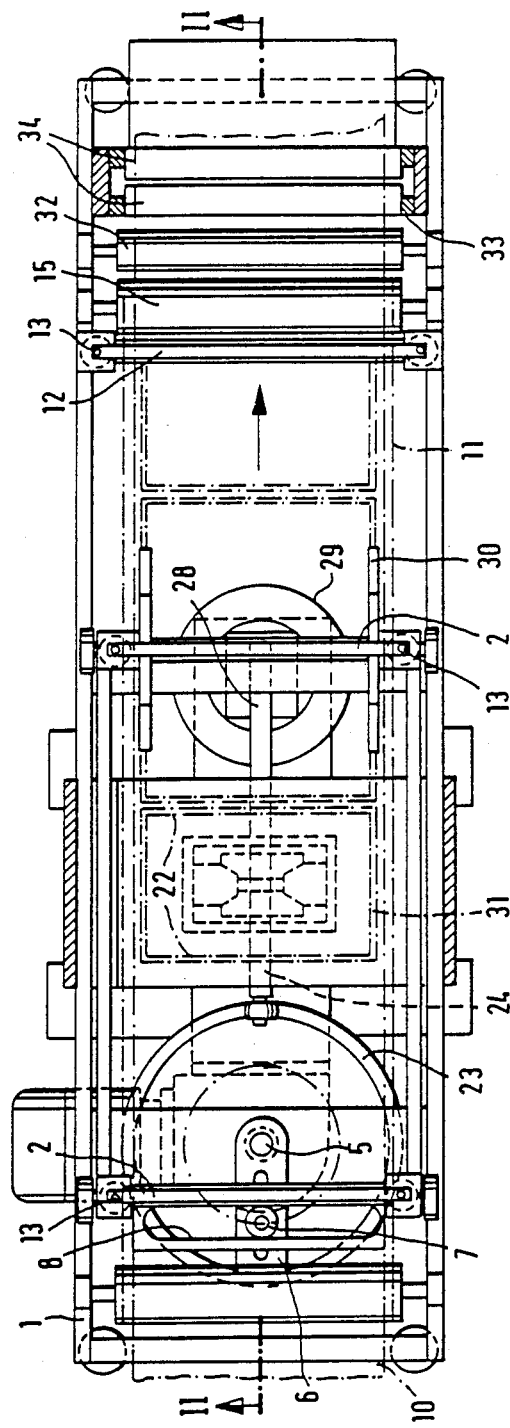
FIG. 1 shows a top view of one embodiment of the invention, in partial cross-section.

As can be seen from the drawings, the machine of the invention comprises a frame 1, on which a carriage 3 carrying a grasping device 2 slides. A multiphase ac motor 4 drives a vertical main drive shaft 5. A crank arm 6 secured to the main drive shaft 5 carries cam roller 7, which fits in a transverse slot 8 in the carriage 3. Slot 8 is perpendicular to the direction of travel of the carriage 3, so that the carriage 3 oscillates when the main drive shaft 5 is turned. In order to change the travel of the carriage 3, the position of the cam roller 7 can be freely adjusted along a longitudinal slot 9 in the crank arm 6.

Overlapping plastic film sheets 10 removed from supply rolls (which are not depicted) are grasped by grasping device 2, and are advanced to the individual processing stations of the machine of the invention. Sheets 10 are supported on a conveyor belt 11 consisting of heat resistant material, preferably polyimide. According to the invention, the overlapping plastic film sheets travel together through the machine. At each of the stations involved they are passed between grasping devices or grippers which may be generally similar in construction. For example, grasping device 2 may simply comprise a bar actuated by pneumatic cylinders 13 to engage plastic sheets withdrawn from a pair of rolls of plastic sheets. When the carriage 3 is moved the sheets are advanced together. The withdrawn sheets then pass through a welding station described below, and optionally a cooling station, also described below. Eventually the welded plastic sheets arrive at a separation station, also described below, at which the paired sheets are separated from one another.

Figure 2:
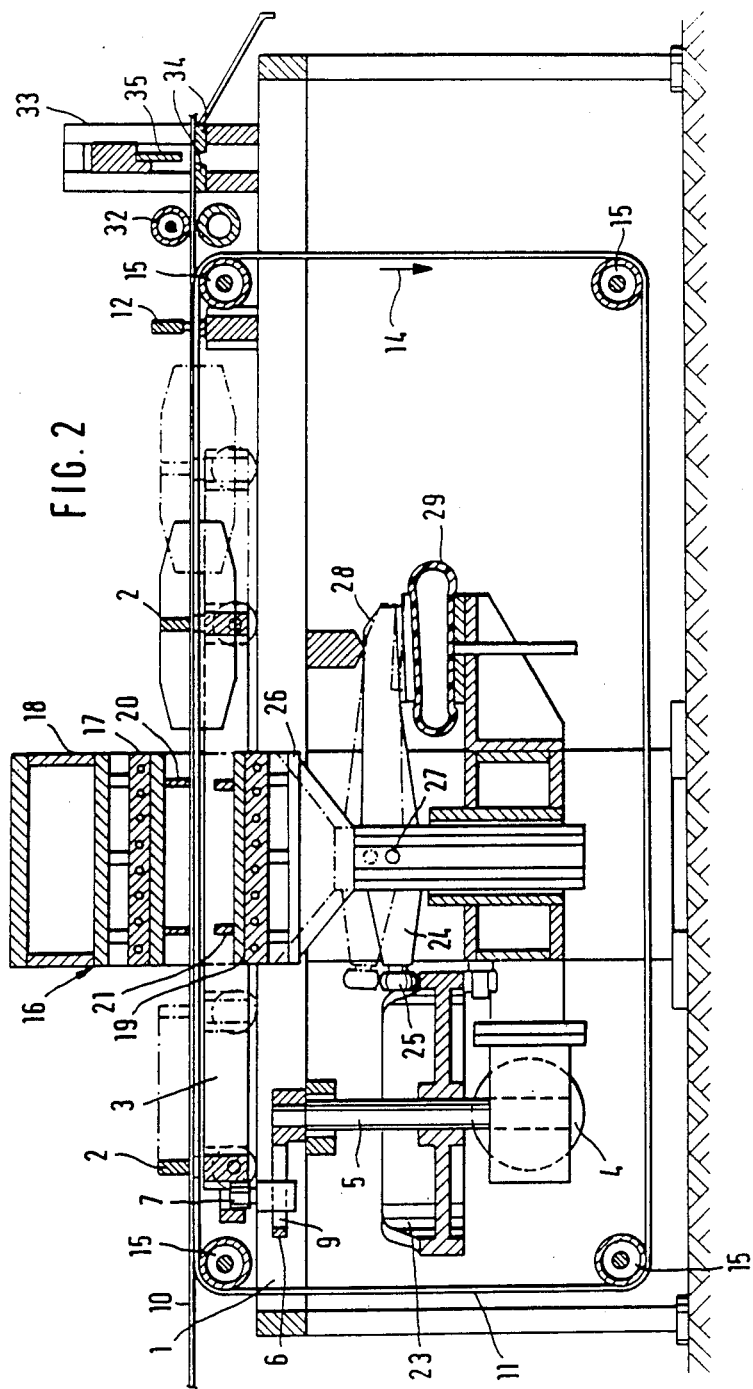
FIG. 2 shows a vertical, longitudinal section through the device of FIG. 1, taken along line II—II of FIG. 1.

In FIG. 2, the feed carriage 3 is depicted in solid lines in its first position, in which the grasping devices 2 grasp the film sheets 10. The second position, at the end of the carriage travel, is depicted in dashed lines; in this position the grasping device 2 releases the film sheets. While the carriage 3 returns to the first position, a stationary gripper 12 holds the film sheets 10. Pneumatic piston/cylinder units 13 activate grasping devices 2 and gripper 12. The pneumatic cylinder units can be controlled by solenoid valves (which are not depicted) disposed in their immediate vicinity. When the grasping device 2 closes, the film sheets 10 and the conveyor belt 11 are held together, so that the belt 11 moves together with the sheets 10 when the carriage 3 moves from the first position into the second position. During the subsequent reverse motion of the carriage 3 from the second position into the first position, when grasping device 2 is open, the gripper 12 prevents the film sheets 10 and the conveyor belt 11 from being moved backward. The endless conveyor belt 11 is guided around the cylinders 15, clockwise in the direction of the arrow 14.

Because the main drive shaft 5 and crank arm 6 rotate continually, the activation of the grasping devices and grippers is controlled by the pneumatic piston/cylinder units 13 to occur as rapidly as possible and precisely at the dead centers of the crank motion. In this way, largely shock-free motion of the film sheets 10 occurs with a high degree of precision. Electronic timing systems for compensation of the inherent response lag times of the pneumatic valves and the piston/cylinder units as a function of the rotation of the main drive shaft are within the skill of the art.

The welding press 16, shown in cross-section in FIG. 2, comprises two heating plates. An upper plate 17 is rigidly secured to a press stand 18, and a lower plate 19 is attached to a lift mechanism by which it is raised and lowered with respect to the upper plate 17. The heat-resistant conveyor belt 11 supports the film sheets 10, and is guided with the sheets between the two plates 17 and 19. The film sheets are welded (along seams as indicated at 22 and 31) by means of welding anvils 20 and 21 attached to the plates 17 and 19 respectively.

Welding thus takes place through the highly heat-resistant conveyor belt 11, which prevents the undesirable adhesion of the film sheets to the heated welding anvil 21. The plates 17 and 19 and anvils 20 and 21 may be electrically heated to suitable temperatures regulated by means of a temperature regulator. In a preferred embodiment, the welding anvil 20 carried by the upper plate 17 is heated to the welding temperature, is shaped corresponding to the contours of the desired weld seam, and is coated with a non-stick layer, e.g. of polytetra-flouroethylene. The lower plate 19 may be coated with an elastic material, but is typically maintained at a temperature that is below the welding temperature.

The conveyor belt need not be used; in this case, the lower heating plate may be associated with a vacuum plate (not depicted in the Figures), which holds the portions of the film sheets 10 to be welded in place when the press is opened. In another modified emobodiment for welding film sheets of greater thickness, a wide welding tool 21 at a temperature above the welding temperature and formed to include an imprint corresponding to the desired contours of the weld 22 may be associated with the lower plate 19 located under the conveyor belt 11. In this case plate 17, above the conveyor belt, includes a tool provided with an imprint corresponding to the desired weld contours, but is maintained at a temperature below the welding temperature.

In order to facilitate access to the tools 20 and 21, the upper portion of the welding press 16, carrying the upper plate 17, may be arranged to swing about a horizontal axis, in a manner which is not depicted in the diagram.

FIG. 2 shows the cylindrical cam 23, which activates the welding press. Cam 23 is secured to the main drive shaft 5 below the crank arm 6. A lever 24 carries a cam roller 25 riding on the cylindrical cam 23. The moving plate 19 of the welding press 16 is pivotally supported at pivot 27 of lever 24, by way of a lift table 26. The fulcrum of the lever 24, that is, its end 28 not carrying the cam roller 25, is supported on a pneumatic bellows or air bag 29.

With each rotation of the main drive shaft 5 and the cylindrical cam 23, lever 24 is moved automatically and the lift table 26 is therefore lifted, and the welding press closed. Because one end of the lever 24 is supported by the bellows 29, it is possible to change the force by which the welding anvils meet, even during the operation of the device, simply by varying the air pressure in bellows 29.

A cooling station is preferably provided directly after the welding press 16. The cooling station comprises cooling jaws 30 which engage and cool the welded seams 31 formed in the welding station. The cooling jaws 30 may be associated with further grasping devices 2a; both may move with the welded sheets upon advancement of the next section of the sheets into the welding station, as indicated by their depiction in dotted lines in FIG. 2. Grasping devices 2a are preferably also cooled.

Plastic film sheets 10 are advanced by a pair of conveyor rollers 32 immediately after the conveyor belt roller 15. Gripper 12 secures the film 10 while in a transverse cutting apparatus 33, which cuts the welded sheets apart in order to isolate the individual products. The cutting apparatus 33 can be embodied as a strip punch with two parallel stationary lower blades 34 and a driven upper blade 35 having a flat cutting surface, which punches a strip from the welded plastic sheets approximately 4 mm in width. This cutting apparatus guarantees good results in cutting welded films to produce articles in which one side is completely open and in which the other side is cut off near the welded seam; for example, file covers, where the "fold" is in fact a welded seam. In comparison with conventional cutting devices having sloped upper blades, the product cut according to this aspect of the invention does not tend to twist, which can result in difficulties in stacking the product.

In the case of articles such as clear covers, file covers, etc., in which a longitudinal weld along the direction of feed would be undesirable, the use of two single-width film sheets, unrolled from the individual rolls of film and welded, may be avoided in favor of use of a double-width plastic sheet as the initial material. The double width sheet may be unrolled from a roll and be folded in the direction of feed using a per se known U-shaped triangular fold. The products can then simply be produced by cutting using the machine of the invention, the welding and cooling stations being disabled.

In order to assure optimum velocity, and therefore particularly effective use of the machine of the invention, the main drive shaft 5 is driven by a multiphase motor 4 via a per se known frequency transformed (not depicted). This allows for a change in the drive shaft rotational speed in very short periods of time, even within a single rotation. For example, it is typically useful to reduce the angular speed of the main drive shaft 5 by means of the frequency transformer at the moment at which the welding 16 press is closed and increase it to normal speed just before the press reopens. In this way the weld time is increased relative to the remainder of the process. The speed of movement is thus reduced during the reverse motion of the carriage, i.e., with the welding press closed.

Figure 3:
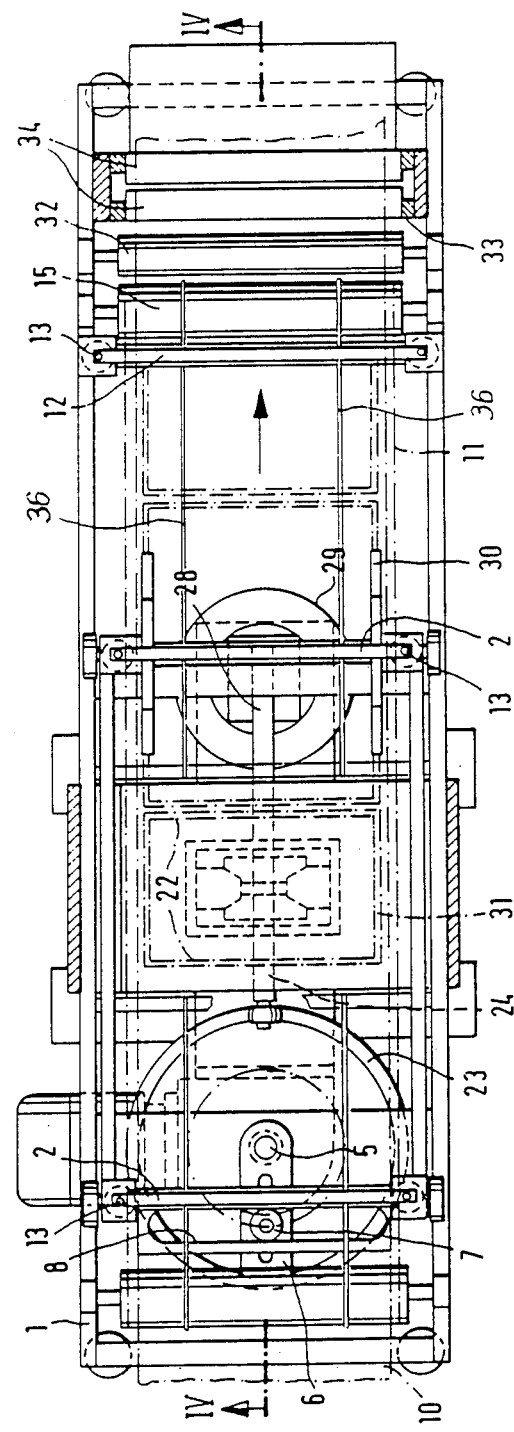
FIG. 3 shows a top view of a modified embodiment of the machine of the invention.

FIGS. 3 and 4 depict a modified embodiment of the invention; the same reference numbers are used for the components which also appear in FIGS. 1 and 2. In the embodiment of FIGS. 3 and 4, parallel plastic cords 36—two being shown—are provided instead of the circulating polyimide conveyor belt 11. These are secured to traverses on the intake and outlet side of the press. As depicted they ride on cylinders 15, or the equivalent, and are kept taut by means of individual counterweights 37. In addition, in this embodiment, instead of the lower welding tool 21 a height compensation plate 38 with a heat-resistant base 39 may be provided. Base 39 may be formed of a silicone rubber. A vacuum plate may also be used to secure the film sheets during the welding process.

Plastic cords 36 in this embodiment serve to support the film sheets 10 near the grasping devices 2. Typically only the upper welding tool 20 is heated, by means of the heating plate 17, to the desired welding temperature; the lower plate 19 and the height adjustment plate 28 and the heat-resistant base 39 are kept below the welding temperature, and serve as support surfaces during the welding process.

As can be seen from a comparison of FIGS. 1 and 2 with FIGS. 3 and 4, the welding press can be reequipped in a simple way in order to switch from one welding job to the other, depending upon specific needs.

While several preferred embodiments of the invention have been disclosed, those of skill in the art will recognize that further improvements and modifications can be made thereto. Therefore, the foregoing disclosure should not be considered to limit the invention, but as merely exemplary thereof; the invention is limited only by the following claims.

What is claimed is:

1. A machine for manufacturing products formed of plastic film sheets, wherein said products are comprises of two overlaying plastic film sheets joined by a weld, said machine comprising a frame supporting a welding station for welding the sheets together and a separation station for cutting the welded sheets into individual products, a feed carriage for withdrawing the overlaying plastic sheets from a supply means, said feed carriage comprising a grasping device and being mounted on said frame from movement there along, a motor driving a drive shaft, said drive shaft carrying a lever supporting a cam roller disposed in a slot in said feed carriage extending transverse to the direction of movement of said feed carriage, so that said motor drives said feed carriage between a first position, in which said grasping device grips said plastic sheets, and a second position, in which said grasping device releases the plastic sheets, at least one pneumatic piston/-cylinder unit controlled by solenoid valve means for actuating said grasping device, a conveyor belt supporting said plastic sheets, a welding press and a cam driven by said drive shaft for activating said welding press, said cam being arranged such that said sheets are welded while said feed carriage returns from said second position to said first position.

2. The machine of claim 1 wherein said conveyor belt is formed of a highly heat-resistant plastic material.

3. The machine of claim 2 wherein said material is polyimide.

4. The machine of claim 1 wherein an additional gripper is provided to hold said sheets stationary during the motion of the feed carriage returning from said second position into said first position and during the welding operation.

5. The machine of claim 1 wherein said cam activating said welding press is a cylindrical cam secured to the drive shaft.

6. The machine of claim 5 wherein said machine further comprises a lever, one end of which carries a cam roller riding on the cam surface of said cylindrical cam, said lever being arranged to activate said welding press.

7. The machine of claim 6 wherein said lever supports said welding press at a pivot point thereof, and wherein said lever is further supported at its fulcrum by a pneumatic bellows, whereby control of the press operating force is effected by variation of the pressure of air in said bellows.

8. The machine of claim 1 wherein the drive shaft is driven by a variable speed motor, such that the rotational speed of the drive shaft may be varied during a particular portion of each rotation thereof.

9. The machine of claim 1 wherein the welding station comprises a welding press comprising two plates between which runs the conveyor belt supporting the plastic sheets to be welded, at least one of said plates being actuated by cam means driven by said drive shaft.

10. The machine of claim 9 wherein the plates of the welding press are electrically heated.

11. The machine of claim 1 wherein said conveyor belt is formed by parallel plastic cords.

12. The machine of claim 11 wherein said welding station comprises upper and lower welding plates, an upper one of said plates located above the plastic cords being heated to a welding temperature suitable for welding the plastic sheets, and a second lower plate located below the plastic cords maintained at a temperature below the welding temperature.

13. The machine of claim 12 wherein said upper plate is shaped to define the desired contours of the weld.

14. The machine of claim 13 wherein said upper plate is coated with a layer of polytetrafluoroethylene.

15. The machine of claim 14 wherein said lower plate is also provided with a heat-resistant surface.

16. The machine of claim 1 wherein said welding station comprises upper and lower plates, a lower one of said plates being a vacuum plate holding the sheets in position during welding.

17. The machine of claim 16 wherein the upper welding tool is shaped to correspond to the desired shape of the weld.

18. The machine of claim 1 wherein said machine further comprises a cooling station for cooling said weld after welding.

19. The machine of claim 18 wherein said cooling station comprises a pair of cooling jaws adapted to engage the weld of said sheets and to move therewith toward said separation station.

* * * * *